(12) United States Patent
Zerega et al.

(10) Patent No.: US 11,601,633 B2
(45) Date of Patent: Mar. 7, 2023

(54) METHOD FOR OPTIMIZED VIEWING EXPERIENCE AND REDUCED RENDERING FOR AUTOSTEREOSCOPIC 3D, MULTIVIEW AND VOLUMETRIC DISPLAYS

(71) Applicant: Magnetic Media Holdings, Inc., New York, NY (US)

(72) Inventors: Thomas Zerega, New York, NY (US); John Martin Bracciante, Jr., Croton On Hudson, NY (US); Zachary Bennett, Stamford, CT (US)

(73) Assignee: Magnetic Media Holdings, Inc., New York, NY (US)

( * ) Notice: Subject to any disclaimer, the term of this patent is extended or adjusted under 35 U.S.C. 154(b) by 0 days.

(21) Appl. No.: 17/490,961

(22) Filed: Sep. 30, 2021

(65) Prior Publication Data

US 2022/0166963 A1    May 26, 2022

Related U.S. Application Data

(60) Provisional application No. 63/085,973, filed on Sep. 30, 2020.

(51) Int. Cl.
*H04N 13/122* (2018.01)
*H04N 13/156* (2018.01)
*H04N 13/302* (2018.01)

(52) U.S. Cl.
CPC ......... *H04N 13/122* (2018.05); *H04N 13/156* (2018.05); *H04N 13/302* (2018.05)

(58) Field of Classification Search
CPC .. H04N 13/122; H04N 13/156; H04N 13/302; H04N 13/351
USPC .......................................................... 348/43
See application file for complete search history.

(56) References Cited

U.S. PATENT DOCUMENTS

| 10,298,921 | B1 * | 5/2019 | Frayne | H04N 13/32 |
| 10,362,301 | B2 * | 7/2019 | Ng | H04N 13/398 |
| 10,721,452 | B2 * | 7/2020 | Peterson | H04N 13/261 |
| 2017/0123219 | A1 * | 5/2017 | Jin | G02F 1/133512 |
| 2019/0222828 | A1 * | 7/2019 | Salvador | H04N 13/351 |

\* cited by examiner

*Primary Examiner* — Tung T Vo
(74) *Attorney, Agent, or Firm* — Schott, P.C.

(57) ABSTRACT

A system and method for creating an improved three-dimensional image includes several steps. One step includes providing one or more adjacent viewing zones, where each of the adjacent viewing zones includes several views of content, and where the adjacent viewing zones include central subset zones that include centrally located views within the adjacent viewing zones, and transition subset views that include views at edges of the adjacent viewing zones. Another step includes inserting at least one of the views from the central subset views into the transition zone to create an expanded transition zone. A further step includes removing at least one transition subset view from the adjacent viewing zone and replacing the removed at least one transition subset view with the inserted at least one of the views from the central subset views.

10 Claims, 4 Drawing Sheets

METHOD FOR OPTIMIZED VIEWING EXPERIENCE AND REDUCED RENDERING FOR AUTOSTEREOSCOPIC 3D, MULTIVIEW AND VOLUMETRIC DISPLAYS

BACKGROUND

Autostereoscopic and multiview displays add a single or multilayer optical lens or filter stack to the front of a pixel array including technologies similar but not limited to LCD, LED, OLED, QLED MicroLED, etc. An issue caused by using lenses or filters such as active or passive lenticular, parallax barrier, electro-wedding, lightfield, switchable/tunable filters or otherwise is that they are location specific and inherently create viewing zones where a set of video or still images project to a given position so the viewer may experience a 3D effect in that zone. Traditionally these zones are sensitive to a number of variables including the alignment of the optical stack on the front of the display, the quality of optics employed, the quality and accuracy of the content that has been created or displayed, and the angle/distance of the viewer with respect to the plane of the display. It's common that viewers, especially those in motion will have a difficult time "getting in a viewing zone" and likely without the use of the invention described herein that the viewer will find it challenging to have a clear 3D image if they move from a precise position due to these tight tolerances.

If the viewer or viewers move too close or too far from the monitor they will have a difficult time "fusing" the stereoscopic images and will be unable to see a complete or continuous scene across the display because the optics do not perform optimally in those positions due to the limitations of the lens itself, the filter stack and the optical properties thereof. Instead, they will see "cross-talk" or the bleeding over of conflicting views of content into their visual field as depicted in the middle and right views in FIG. 1. For example, the left view in FIG. 1 shows the image 100 viewed from the optimal viewing distance and angle as defined by the properties of the lens. This contrasts with the middle view of the image 110 where a viewer is not optimally positioned therefore the image results in viewer seeing image pairs that are further apart than intended and the right image 120 shows how certain "smoothing" effects can be used to improve or minimize these imperfections.

These limitations are generally known to those working in the field. Until now, the methods to work around these shortfalls have been by either controlling the viewing distance and viewing area to optimize the experience or reducing the volumetric space through a reduction of parallax thereby limiting the full capabilities of the solution.

In addition, the traditional defined viewing zones repeat to allow "x" number of viewers to experience a 3D, stereoscopic, motion parallax, or other multiview effect for their given position. While this technique succeeds in generating the effect within the viewing zone, if the user moves laterally to the display system, they will pass through an abrupt "transition zone" and see the left and right image flip or reset when they enter the new viewing zone as depicted in a traditional view ordering as seen in FIG. 2.

To be clear the content for each of the views may be captured or created by either real cameras or virtual views, defined by depth maps, conversion processes, rotoscoping, and/or various other methods that enable the creation of multiple images or videos. Whether captured, or delivered directly in real-time, streamed, or from a software application—the intent is to provide the viewer with slightly different perspectives of content for each eye that are resolved in the brain correctly so as to provide the viewer with depth perception as experienced in real life. Delivering these views is both an art and science whereby the creator, such as a 3D animator or stereographer, produces a stereoscopic illusion that is experienced on a 3D display that does not require 3D glasses. Cohesion of these systems remains paramount to creating an optimal experience.

Each of the numbers 1-9 represents an individual view of content rendered or captured from different perspectives to be presented to either eye in a given viewing zone projected by a device 200. In this example each of the viewing zones 210, 220, 230 are intended to present the same 3D experience without glasses to the viewer such that either a single viewer moving laterally across the viewing zones or multiple viewers positioned in each of these viewing zones, would each see the same 3D scene from their position.

It being understood that in an ideal scenario, as a viewer moves from left to right their eyes will pick up a stereo pair of images where the proper left eye image and right eye images are separated correctly as in real life.

FIG. 3 depicts Viewer A, having a left and right eye, and standing perfectly in a viewing zone 310 such that their visual field is limited to only seeing only views 1-9 in that order and whereas Viewer B is straddling two viewing zones 320, 330 with views 9 and 1 in the center of Viewer B's visual field (370). The edges of each viewing zone 310, 320, 330 are referred to as a transition subset zones (315, 325) while views 2-8 (numbered as 312, 322, 332) are a central subset zone of views 312, 322, 332 that are not part of the transition zone and are more centrally located within each viewing zone 310, 320, 330. In both instances, Viewer A and Viewer B observe all the views 1-9 but the Viewer B's brain may be unable to resolve the parallax from views 9 to 1 (in the transition between views, 325) because the amount of parallax between those views is too great.

SUMMARY OF THE EMBODIMENTS

Reducing the amount of parallax in transition zones between adjacent views improves the viewing experience and the system and method addresses this.

The system and method solve a number of challenges with respect to the quality of the viewing experience across autostereoscopic, multiview and/or volumetric display systems and the production of content for these systems by simultaneously reducing both offline and real-time rendering requirements. These improvements significantly impact the commercial viability of these systems for use in any application including but not limited to professional, industrial and consumer applications. The benefits transcend multiple aspects of the display system which include but are not limited to optimizing and maximizing the viewable area in front of the display, the bill of materials to manufacture the product and costs to serve the content (i.e. the embedded or connected electronics such as computers, FPGA's, SOC's, CPU's, GPU's), as well as the costs for streaming content via reduced bandwidth—all of which can be executed while preserving the quality and continuity of the viewing experience. Furthermore, the benefits of this system extend to the scalability of volumetric content by offering a "lite" format that can embraced easily on existing communications platforms, and supported by current hardware, software, and API's.

A system and method for creating an improved three-dimensional image includes several steps. One step includes providing one or more adjacent viewing zones, where each of the adjacent viewing zones includes several views of content, and where the adjacent viewing zones include central subset zones that include centrally located views within the adjacent viewing zones, and transition subset views that include views at edges of the adjacent viewing zones. Another step includes inserting at least one of the views from the central subset views into the transition zone to create an expanded transition zone. A further step includes removing at least one transition subset view from the adjacent viewing zone and replacing the removed at least one transition subset view with the inserted at least one of the views from the central subset views.

DETAILED DESCRIPTION OF THE EMBODIMENTS

This method and system herein describe a new multiview content format that provides numerous benefits. The design preserves significant motion parallax and disparity between views and provides a more comfortable and acceptable viewing experience for the user.

This invention discloses the design of a system that could be used in printed media or with projection systems in movie theaters when coupled with the optical components, but is primarily positioned for use on digital displays such LCD, LED, OLED, QLED MicroLED, NanoLED etc whereby an optical element is positioned in front of or within these displays to beam steer light actively or passively into the viewers eyes. The optical element may include (but not be limited to) one or more optical technologies individually or combined such as lenticular lens, parallax barrier, chromatic light deflector, polarizer films, active or switchable membranes, electro-wedding, light field, switchable or tunable filters, micro mirrors, electro-mechanical lens, shutter, liquid-crystal, molds, films, or other similar systems that allow for the presentation of multiple perspective views of content for 3D, depth perception, "flip", or other optical effects which may be considered herein all forms of an autostereoscopic or Multiview display systems.

Figure 1:
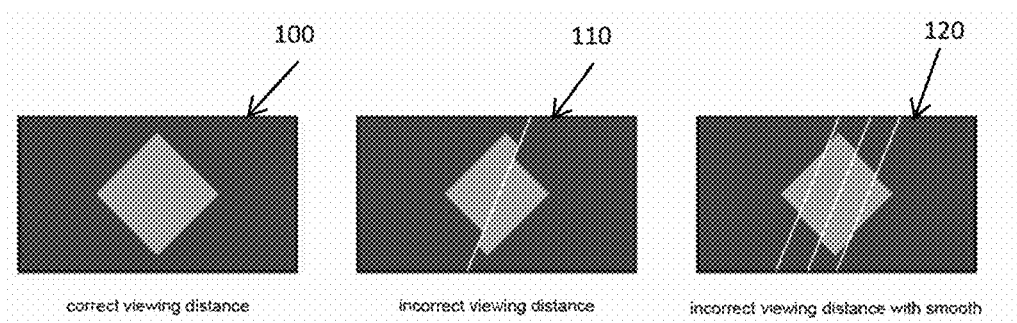
FIG. 1 shows bleeding over of conflicting views to an observer using prior art viewing techniques.
Figure 2:
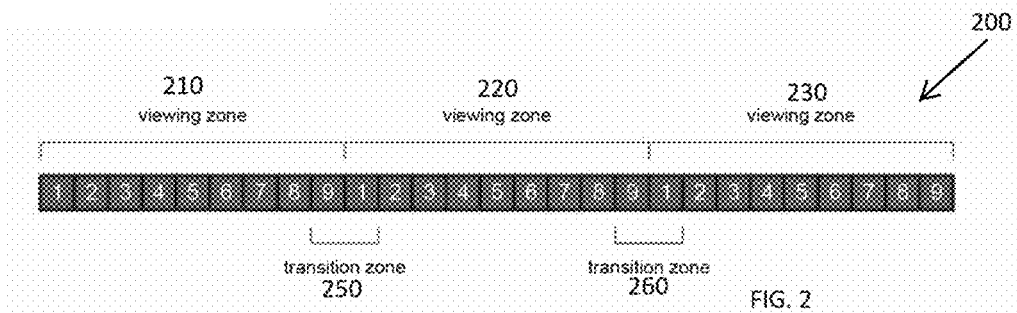
FIG. 2 shows the image flip or reset of a viewing experience as depicted in a prior art view ordering.
Figure 3:
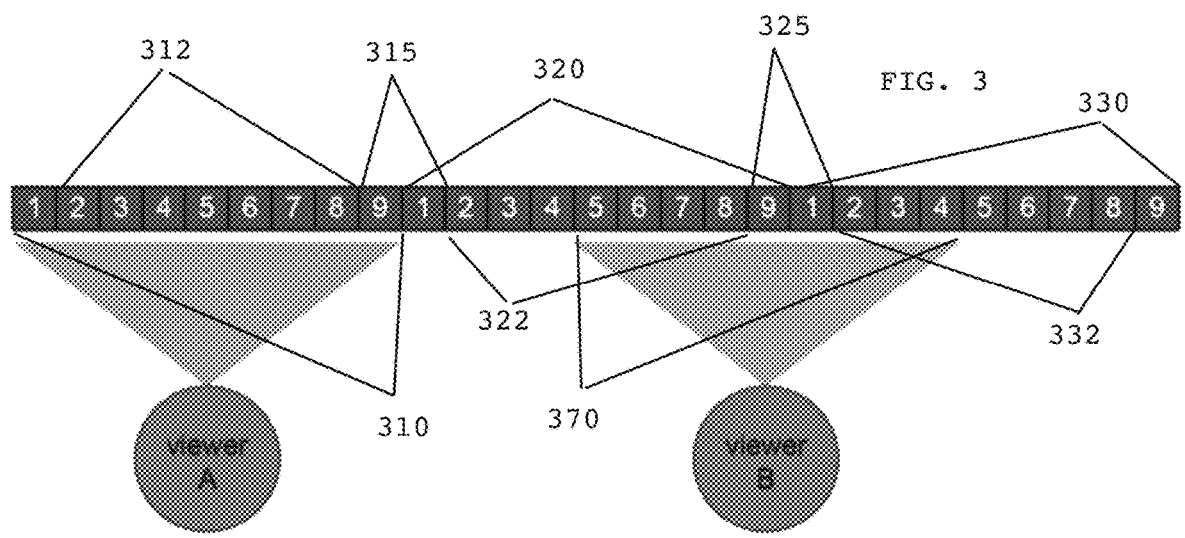
FIG. 3 shows a viewer's point of view looking at an embodiment of the prior art in the traditional viewing order.
Figure 4:
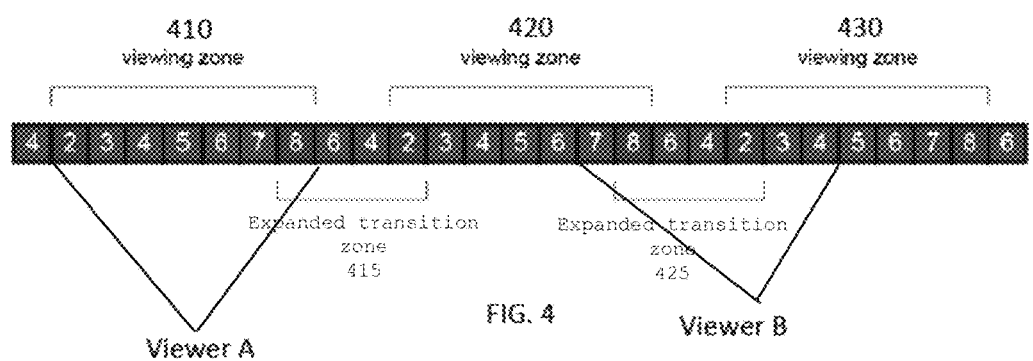
FIG. 4 represents one an embodiment of the invention which for the purposes of simplicity dubbed herein as the "smooth format."

FIG. 4 represents one embodiment of the invention, which for the purposes of simplicity has been dubbed herein as the "smooth format." With non-limiting reference to a 9-view embodiment like that shown in FIG. 3, FIG. 4 shows a smoothed formatting of the views in which the transition zone has been expanded with additional views to reduce parallax.

As shown in FIG. 4, the system and method herein, which would likely be software implemented using a computer, but could be hardware-implemented, replaces views 9 and 1 in the transition subset zones (FIG. 3. 315, 325) with views 6 and 4 from the central subset zones 312, 322) to create expanded transition zones 415, 425 that provide better parallax continuity for the viewer regardless of their position in front of a content delivery device (projector, display, screen). This also creates truncated viewing zones 410, 420, 430, because of the deletion of views 1 and 9 from the extreme edges of the original viewing zones 310, 320, 330 to insert the required views for the smoothing effect. Said another way, the content delivery device projects and repeats views 2-8 and replaces views 9 and 1 with views 6 and 4 in that order. The effect of which is a more seamless 3D experience for all viewers as a result of greater "parallax-continuity" across the display device from various viewing positions including the transition zone.

It should be appreciated that in a different approach, views from the central subset views may be inserted between views 9 and 1 without removing 1 or 9 to also create smoothing. The disadvantage of this approach is an increase in bandwidth required but there is an advantage in no loss of content in the removed views 1 and 9.

Parallax continuity aims to maintain consistent stereoscopic separation between views irrespective of whether the viewer is in a viewing zone (Viewer A), straddling a transition zone (Viewer B), or whether those views may in fact be reversed for the viewer. The continuity of said parallax is of utmost importance and aids the viewer in having a comfortable and consistent 3D experience from any position.

While it seems counterintuitive to have a what could be referred to as a "wider" transition zone requiring more views before the view pattern repeats, the purpose is to keep the parallax between stereo pairs consistent, so the brain continues fusing the 3D images while traversing from one viewing zone to the next thus masking the presence of traditional defined viewing zones almost entirely. Said another way, the larger transition zone may still result in some visual artifacts momentarily for some viewers but the benefit far outweighs the penalty of the traditional method which can disorient the user with an abrupt and more pronounced reset of views. In FIG. 4, if a viewer was traversing the display from left to right, it's clear that the distance between the content delivered to the viewers eyes in view 8 and view 6 then view 6 and view 4, and then view 4 and view 2 is consistent and less than the abrupt change in traditional systems such as 9 back to 1.

Figure 5:
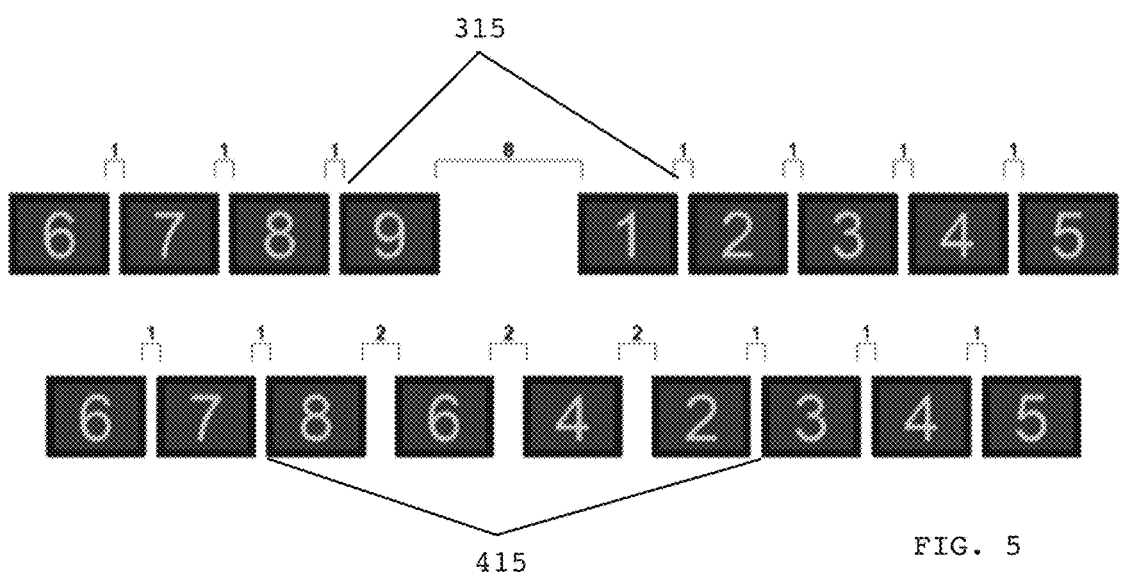
FIG. 5 Shows the number of views missing in a traditional transition zone (top) versus the "smooth" format (bottom).

While all displays and required parallax for optimal viewing may be different based on parameters such as resolution, lens design, type of content, and size of the display FIG. 5. shows a close up of the view order to examine the amount of parallax from one view to the next (small number noting the gap between adjacent views) whereby 1 represents the ideal amount of parallax from 1 view to the next. The traditional transition zone as depicted in 315 from FIG. 3 (top) versus the "smooth" format expanded transition zone 415 from FIG. 5 (bottom) demonstrates that the former has eight times the amount of ideal parallax in the transition zone in contrast to two times the amount of ideal parallax in the smooth format below. Explaining this further, the traditional transition zone features significantly greater than ideal parallax as shown between views 9 and 1. This contrasts with the limited and consistent parallax of 2 views offered in the expanded transition by using the smooth format example in FIG. 5. Thus, the smooth format transition zone improves the user experience substantially over the traditional by eliminating the severe change in parallax and replacing it with more closely paired views.

Figure 6:
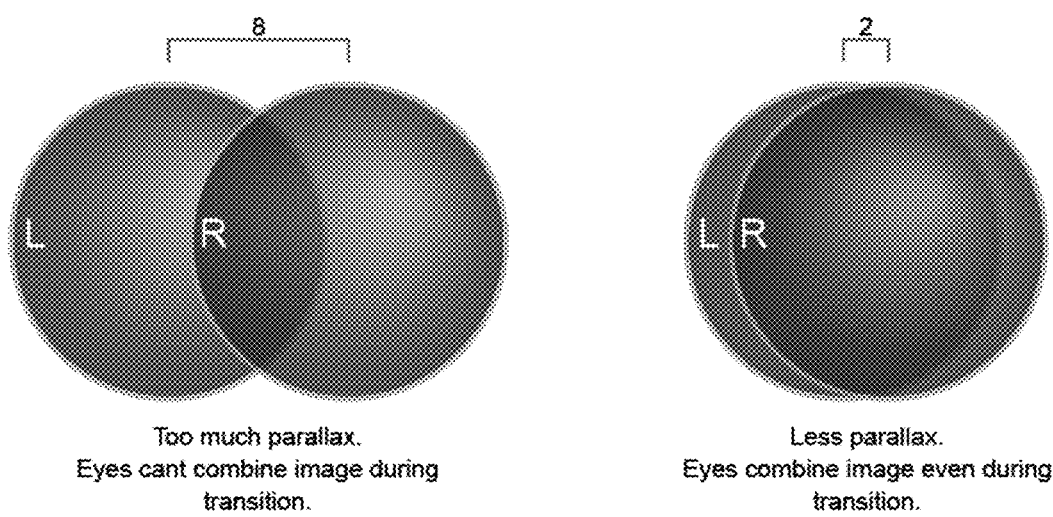
FIG. 6 shows a parallax problem comparison.

FIG. 6 further illustrates what is shown in FIG. 5 as it shows the user's eyes and their experience as the image becomes separated by 8 views in the traditional presentation whereas the smooth format in FIG. 4's embodiment limits this gap to "2" views.

Displays are adding more resolution such as 8K, 16K and beyond. It is therefore contemplated that greater resolution begets the opportunity to present move views in order to continue the "look-around" or motion parallax effect with aims of achieving what some may dub a "holographic" effect. While the term "holographic" effect may be in correct technically it describes an experience whereby content appears to float in front of the display surface that the viewer could fully "look-around" as if it were real. To achieve this more information would need to be captured and presented on screen from those perspectives and at the same time, essentially streaming those perspectives through each of the views. While displaying more views when sufficient resolution allows can create a more realistic or seemingly "holographic" experience, it is also true that when the viewer passes through all of the views in a viewing zone, their transition zone will have a reset back to the first image and for that reason, the invention may provide a continuing advantage as more resolution leads to larger viewing zones packed with more views in aims of one day reaching a "transition-free" experience with "no reset" of the views.

Figure 7:
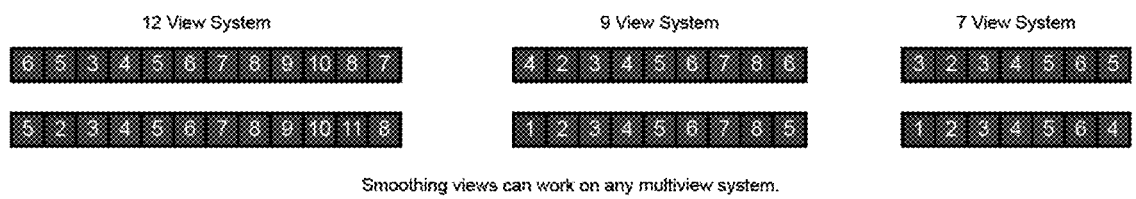
FIG. 7 shows a technique that can be applied for "n" views where "n" is more or less than 9.

While one embodiment shown herein includes a system with the potential to support 9 simultaneous views, the technique can be applied for "n" views where "n" is more or less than 9 as shown in FIG. 7, which shows possible arrangements of 12, 9, and 7 view multiview systems respectively moving from left to right, with each view showing a different arrangement of the content and different ways to present the transition zones.

For video content this technique works well especially for scenes where the background is in motion, however, the reversal of views at the transition zone may be more evident in still images or video where the background is not in motion. In those circumstances, when the viewer is moving, depending on the type of content being displayed, they may notice a warping effect on the content.

Figure 8:
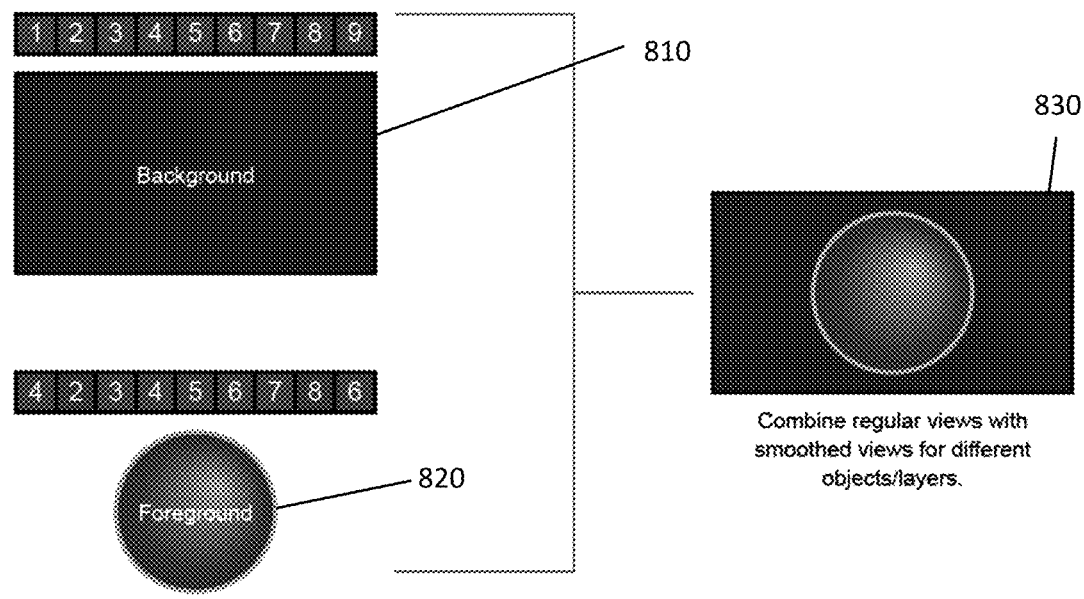
FIG. 8 shows a technique that could be applied for offline or real-time rendering (such as a game-engine).

A concept for minimizing this side effect is multi-pass rendering, whereby the foreground elements are rendered using the smooth format, and the background is rendered using the traditional method. This technique could be applied for offline or real-time rendering (such as a game-engine) as depicted in FIG. 8. An example could be considered with the New York City skyline in the background 810 where multipass rendering would leave the buildings exactly where they were captured instead of reordering that content. The foreground image 820, using the smooth format discussed in above, whereby as an example a 3D animation of a water bottle is floating in front of the skyline. In this case the smooth content could be applied to the bottle to provide a comfortable experience from any viewing position while keeping the background true to its original form. The inventors envision combining the background image 810 and foreground image 820 into a combined image 830 to reduce artifacts that may be caused by using the smooth format and could be perceived by the viewer with certain types of content.

As a result of masking the transition zone to a level of market acceptance, the system and method has a number of practical applications and solves a number of challenges with respect to the quality of the viewing experience across autostereoscopic, multiview and/or volumetric display systems and the production of content for these systems. The method simultaneously reduces both offline and real-time rendering requirements. These improvements significantly impact the commercial viability of these display systems for use in any application including but not limited to professional, industrial and consumer applications and the benefits transcend multiple aspects of the display system which include but are not limited to optimizing and maximizing the viewable area in front of the display, reducing the bill of materials to manufacture the product and costs to serve the content (i.e. the embedded or connected electronics such as computers, FPGA's, SOC's, CPU's, GPU's), as well as the costs for streaming content via reduced bandwidth required—all of which can be executed while preserving the quality and continuity of the viewing experience. Furthermore, the benefits of this system extend to the scalability of volumetric content by offering a "lite" format that can embraced easily on existing communications platforms and websites, and integrated with current hardware, software, and API's. Said another way, the format is a way of delivering a 3D, seemingly holographic or volumetric content that is acceptable to the viewer(s), requires less hardware, software and render time, and compresses an otherwise unwieldy amount of the information without a significant trade off in the viewing experience.

While the invention has been described with reference to the embodiments above, a person of ordinary skill in the art would understand that various changes or modifications may be made thereto without departing from the scope of the claims.

We claim:

1. A method for creating an improved three-dimensional image comprising:
   providing one or more adjacent viewing zones, wherein each of the adjacent viewing zones includes several views of content, wherein the adjacent viewing zones include central subset zones that include centrally located views within the adjacent viewing zones, and transition subset views that include views at edges of the adjacent viewing zones; and
   inserting at least one of the views from the central subset views into the transition zone to create an expanded transition zone.

2. The method of claim 1, further comprising removing at least one transition subset view from the adjacent viewing zone and replacing the removed at least one transition subset view with the inserted at least one of the views from the central subset views.

3. The method of claim 2, wherein in the removal step, the number of transition subset views removed is two.

4. The method of claim 3, wherein in the insertion step, the number of central subset views inserted into the expanded transition zone is two.

5. The method of claim 2, wherein each of the adjacent viewing zones include identical views of content.

6. The method of claim 2, wherein the several views number nine.

7. The method of claim 2, wherein the several views number seven.

8. The method of claim 2, wherein the several views number twelve.

9. The method of claim 2, wherein the method creates an image configured for viewing on a display.

10. The method of claim 9, wherein the display is a multiview display.

\* \* \* \* \*